(12) United States Patent
Shapiro et al.

(10) Patent No.: US 7,206,868 B2
(45) Date of Patent: Apr. 17, 2007

(54) METHOD AND SYSTEM FOR PROVIDING A PERIPHERAL SERVICE TO A HOST COMPUTING DEVICE

(75) Inventors: Daniel J Shapiro, Redmond, WA (US); Jonathan T Grudin, Issaquah, WA (US); Chris J Guzak, Kirkland, WA (US); Gavin Jancke, Sammamish, WA (US); Chad L Magendanz, Issaquah, WA (US); Brian R Meyers, Bellevue, WA (US); Michael G Tricker, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 0 days.

(21) Appl. No.: 11/340,717

(22) Filed: Jan. 27, 2006

(65) Prior Publication Data

US 2006/0123144 A1    Jun. 8, 2006

Related U.S. Application Data

(63) Continuation of application No. 10/456,406, filed on Jun. 6, 2003, now Pat. No. 7,043,572.

(51) Int. Cl.
 *G06F 3/00* (2006.01)
 *G06F 13/00* (2006.01)
(52) U.S. Cl. ............................. 710/14; 710/15; 710/62; 710/72; 709/217
(58) Field of Classification Search .................... 710/2, 710/8–19, 36–45, 58–63, 72–74; 709/203, 709/226, 217–218, 227–233; 707/9–10; 715/718; 725/141

See application file for complete search history.

(56) References Cited

U.S. PATENT DOCUMENTS

| | | | |
|---|---|---|---|
| 5,682,486 A | 10/1997 | Grossman et al. | |
| 5,923,307 A | 7/1999 | Hogle, IV | |
| 6,018,340 A | 1/2000 | Butler et al. | |
| 6,104,359 A | 8/2000 | Endres et al. | |
| 6,141,705 A | 10/2000 | Anand et al. | |
| 6,161,104 A | 12/2000 | Stakutis et al. | |
| 6,295,051 B1 | 9/2001 | Kanevsky et al. | |
| 6,538,880 B1 | 3/2003 | Kamijo et al. | |
| 6,721,787 B1 | 4/2004 | Hiscock | |
| 6,745,047 B1 * | 6/2004 | Karstens et al. | 455/556.1 |
| 6,798,647 B2 | 9/2004 | Dickie | |

(Continued)

*Primary Examiner*—Christopher Shin
(74) *Attorney, Agent, or Firm*—Banner & Witcoff, Ltd.

(57) ABSTRACT

Disclosed is a method for one computing device (the "provider") to provide peripheral services to another device (the "host"). A user directly runs the host. The host accesses the provider as if the provider were a set of peripheral devices attached to the host. In this way, the host and provider become, in effect, one device with the combined capabilities of both devices. The provider switches between two modes: In standalone mode, the provider acts as an individual device; upon switching to auxiliary mode, the provider provides peripheral services to the host but can still run applications and present an input/output interface to its own user. When the peripheral device provided to the host is a display screen, the host can map the provided screen into the host's own video memory, thus hiding implementation details from applications that use the screens. One device can simultaneously act as provider and host.

20 Claims, 8 Drawing Sheets

U.S. PATENT DOCUMENTS

| | | |
|---|---|---|
| 6,990,533 B1 * | 1/2006 | Creemer ..................... 709/248 |
| 7,124,374 B1 * | 10/2006 | Haken ....................... 715/859 |
| 2002/0103008 A1 | 8/2002 | Rahn et al. |
| 2003/0229731 A1 | 12/2003 | Keller |
| 2004/0019724 A1 * | 1/2004 | Singleton et al. ........... 710/303 |
| 2004/0224638 A1 * | 11/2004 | Fadell et al. ............... 455/66.1 |

* cited by examiner

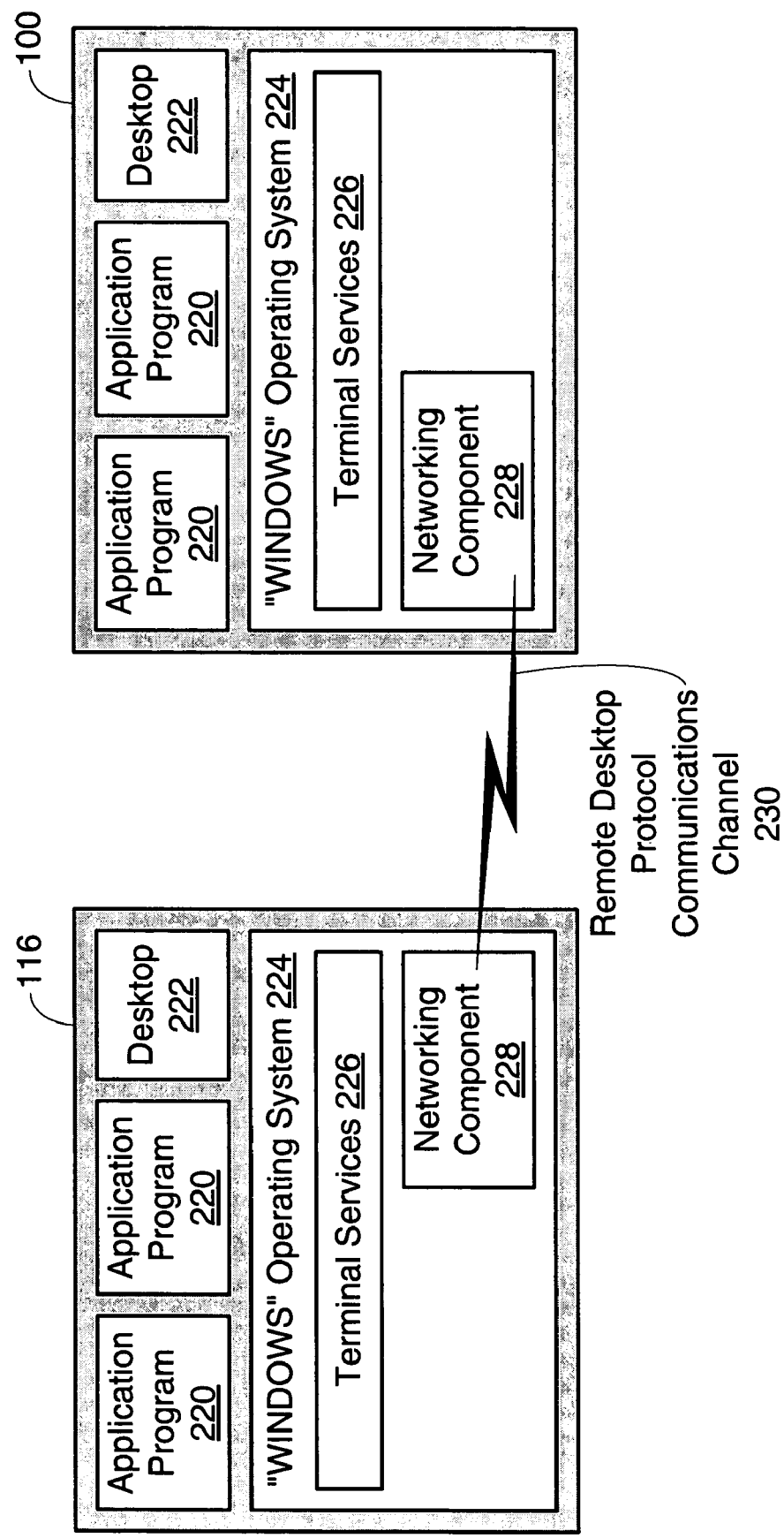

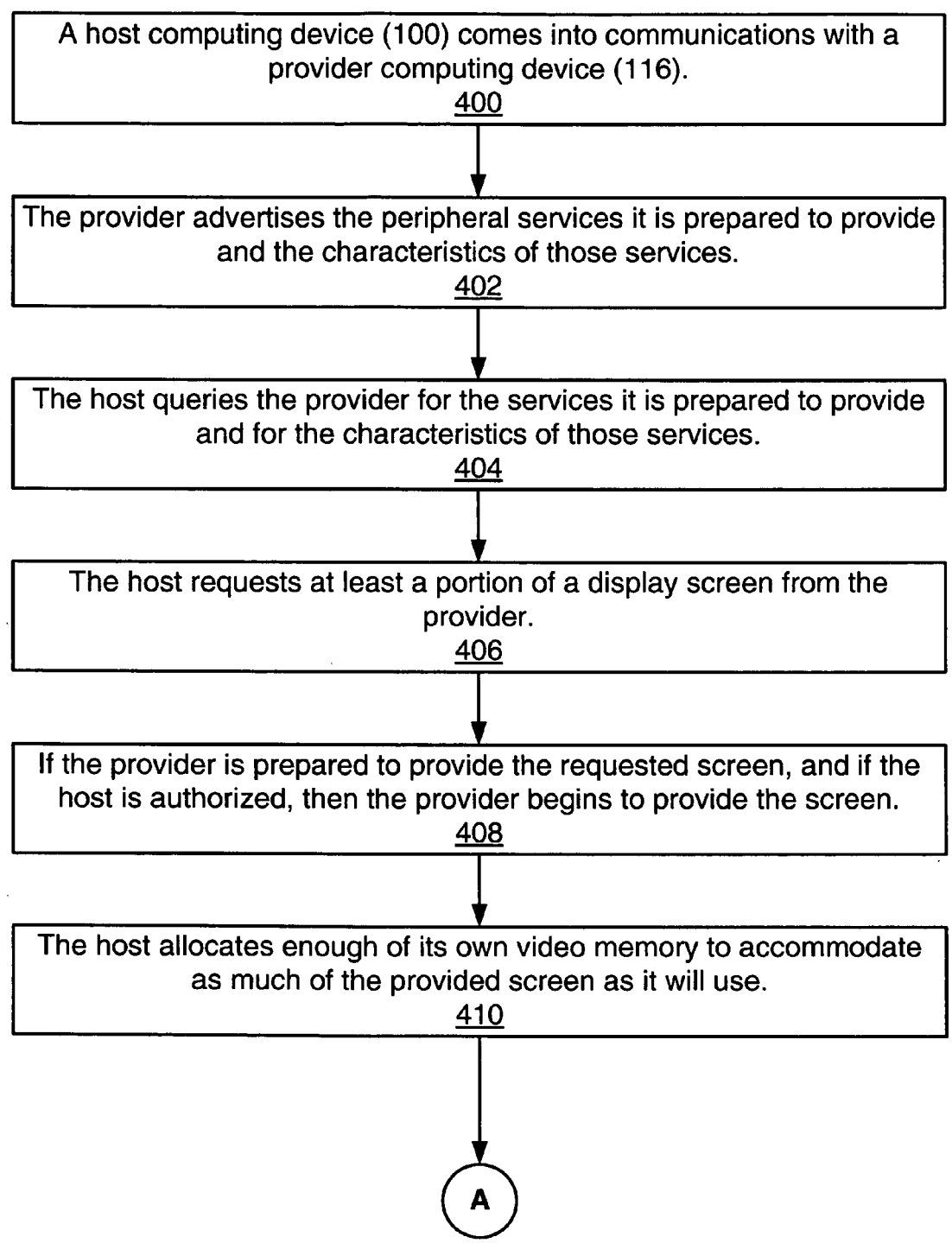

The host makes requests of the provided screen, at least in part, by accessing the allocated video memory. The provider fulfills the requests.
412

The host releases the provided screen and releases the video memory allocated to its control.
414

METHOD AND SYSTEM FOR PROVIDING A PERIPHERAL SERVICE TO A HOST COMPUTING DEVICE

This application is a continuation of and claims priority to U.S. Ser. No. 10/456,406, filed Jun. 6, 2003, now U.S. Pat. No. 7,043,572 which is hereby incorporated in it entirety.

TECHNICAL FIELD

The present invention is related generally to computing devices, and, more particularly, to providing, by one computing device, a peripheral service to another computing device.

BACKGROUND OF THE INVENTION

In recent times, the proliferation of portable computing devices has revolutionized the world's computing environment. Fueled by advances in computing power and by the spread of high-speed wireless communications networks, this revolution is rapidly expanding both the number and the types of portable devices. Some portable devices, including personal digital assistants (PDAs) and cellular telephones, use modern computing and communications technology to provide enhanced versions of specific services. Other portables, such as laptop and hand-held computers, rival traditional, or "desktop," computers in capability. (For the sake of brevity, the present discussion calls fixed-location personal computing devices "desktop computers." This phrase is meant to include tower computers, centralized servers, and any other computing device that is not designed to move around.)

However, and despite some predictions, the emergence of portable computing has not led to the demise of the desktop computer. Desktops still often enjoy advantages in screen size, in wealth of peripheral devices, in speed of communications connections, and in price over portable devices. Because of this, most people with portable devices still use a fixed-location desktop computing device at home and at work.

People who use both portables and desktops have become accustomed to linking the devices together. This linking is performed in the service of "alternative" or "sequential" use. A portable is often used while commuting or on trips, while a desktop is used whenever the user is in the office or at home. When the user brings the portable to the location of the desktop computing device, the devices are temporarily linked together in order to synchronize their information content. For example, documents created on the portable are copied to the desktop for more reliable storage and to be printed on network printers. E-mails received at the desktop are transferred to the portable so that they may be read and answered when the user is on the move.

What has been lacking is a workable paradigm for using the portable and desktop computing devices concurrently. Once its data store is synchronized with the desktop, a wonderfully capable portable can sit unused until the time comes for another commute or business trip. In the eyes of corporate (and personal) accounting, this lack of concurrent usefulness makes the portable device an "additional" expense over and above the "necessary" expense of the desktop device.

SUMMARY OF THE INVENTION

In view of the foregoing, the present invention provides a way for one computing device to provide peripheral services to another computing device. A user directly runs one of the two devices (the "host"). The host device accesses the other device (the "provider") as if the provider device were a set of one or more peripheral devices attached to the host. In this way, the host and provider become, in effect, one computing device with the combined capabilities of both devices.

The provider computing device switches between two modes: a standalone mode and an auxiliary mode. In standalone mode, the provider acts as an individual device. Upon switching to auxiliary mode, the provider provides one or more peripheral services to the host computing device. For example, a provider with a display screen puts that screen under the control of the host. The host uses the provider's display screen as a second display and can then present more screen "real estate" to its user. In some embodiments, the host is not aware that the peripheral services are provided by a separate computing device and treats the services as if they were provided by peripheral devices directly connected to and controlled by the host. In some embodiments, the host is explicitly aware that the peripheral service is provided by a separate device and takes advantage of that fact. For example, the host can choose to display items of lesser importance on a smaller, shared display, because that display may be detached later. While in auxiliary mode, the provider does not lose its individual character and can run applications and present an input/output interface to its own user independently of any services it provides to the host.

Switching between the two modes can be triggered when the provider detects a communications connection with the host. For example, the provider is a PDA, and it switches to auxiliary mode when placed in a cradle connected to the host. Switching can be under the direct control of a user. For example, the provider is always in contact with the host (e.g., via a wireless network), and the user initiates the auxiliary mode upon entering the room. Alternately, the user overrides auxiliary mode to use the provider directly. Switching can be triggered by proximity, for example when a wireless network locates the provider and host as being in physical proximity to one another. In any case, once the two devices are in communications with one another, the provider device can advertise the services it offers, and the host can query the characteristics of the provider's offerings.

When the peripheral device provided to the host is a display screen, the host can map the provided screen into the host's own video memory. With this technique, the host uses its own video memory to access both its local screen and the provided screen, thus hiding implementation details from applications that use the screens. This technique works as well when only a portion of the screen is provided to the host.

One device can simultaneously act as provider and host. A provider can offer peripheral services to more than one host, and a host can accept peripheral services from more than one provider. Security can be provided so that a provider only provides peripheral services to authorized hosts.

BRIEF DESCRIPTION OF THE DRAWINGS

While the appended claims set forth the features of the present invention with particularity, the invention, together with its objects and advantages, may be best understood from the following detailed description taken in conjunction with the accompanying drawings of which:

FIG. 2*b* is a schematic diagram showing exemplary software that supports communications between a provider computing device and a host;

FIGS. 4*a* and 4*b* together form a flowchart showing an exemplary method according to the present invention for a host to use a peripheral display screen by mapping the screen into the host's video memory.

DETAILED DESCRIPTION OF THE INVENTION

Figure 1:
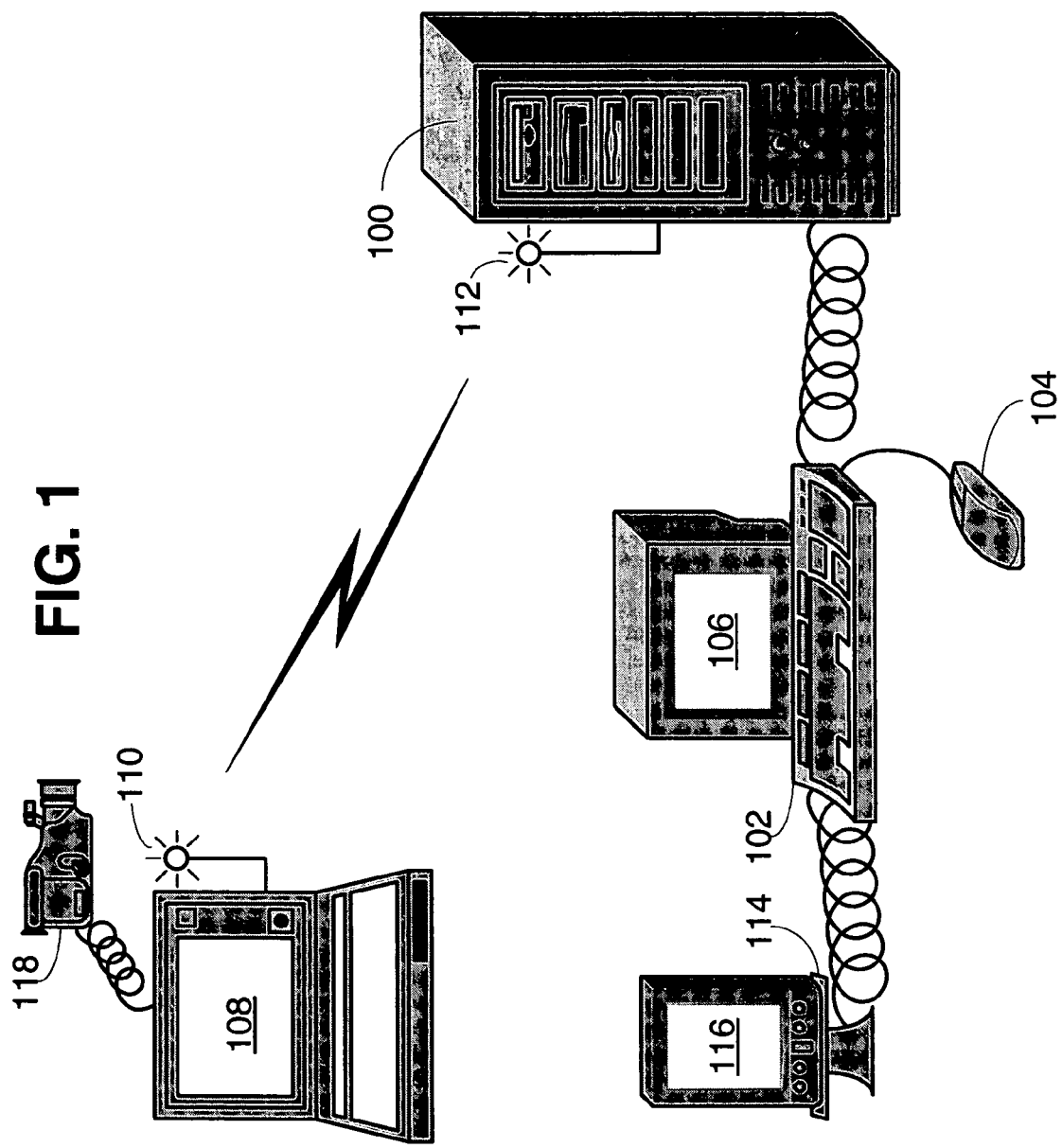
FIG. 1 is a block diagram showing an exemplary computing environment with a host computing device and two provider computing devices, the first a laptop computer and the second a personal digital assistant, providing peripheral services to the host.

Turning to the drawings, wherein like reference numerals refer to like elements, the present invention is illustrated as being implemented in a suitable computing environment. The following description is based on embodiments of the invention and should not be taken as limiting the invention with regard to alternative embodiments that are not explicitly described herein.

In the description that follows, the present invention is described with reference to acts and symbolic representations of operations that are performed by one or more computing devices, unless indicated otherwise. As such, it will be understood that such acts and operations, which are at times referred to as being computer-executed, include the manipulation by the processing unit of the computing device of electrical signals representing data in a structured form. This manipulation transforms the data or maintains them at locations in the memory system of the computing device, which reconfigures or otherwise alters the operation of the device in a manner well understood by those skilled in the art. The data structures where data are maintained are physical locations of the memory that have particular properties defined by the format of the data. However, while the invention is being described in the foregoing context, it is not meant to be limiting as those of skill in the art will appreciate that various of the acts and operations described hereinafter may also be implemented in hardware.

FIG. 1 presents an exemplary computing environment in which the methods of the present invention are practiced. A host computing device 100 is represented as a PC (personal computer). The host 100 has traditional peripheral devices such as a keyboard 102, a mouse 104, and a display screen 106. A first provider computing device 108 is represented as a laptop PC. The laptop provider 108 is in communications with the host 100 via a wireless link, represented by the antennae 110 and 112 on the laptop provider 108 and on the host 100, respectively. Physically attached to the host 100 is a cradle 114 that holds a second provider 116, here represented as a personal digital assistant. The PDA provider 116 communicates with the host 100 via the cradle 114.

The portable devices 108 and 116 switch between a standalone mode and an auxiliary mode. When in auxiliary mode, the portable devices 108 and 116 provide peripheral services to the host 100. For purposes of illustration, the PDA 116 provides its touch-sensitive display screen as an input and output peripheral. The laptop 108 provides a camera 118 as an input peripheral. Note that in the context of the present discussion, the word "peripheral" is used from the viewpoint of the host 100. For example, the laptop provider 108 can use its central processor to provide computational services to the host 100. Those computational services are then called a "computational peripheral" from the host 100's viewpoint, although that central processor would not traditionally be called a peripheral of the laptop provider 108.

Note also that the present invention is not limited to the scenario depicted in FIG. 1. In the general case, the host 100 need not be a fixed-location computing device, and the providers 108 and 116 need not be portable computing devices.

Figure 2A:
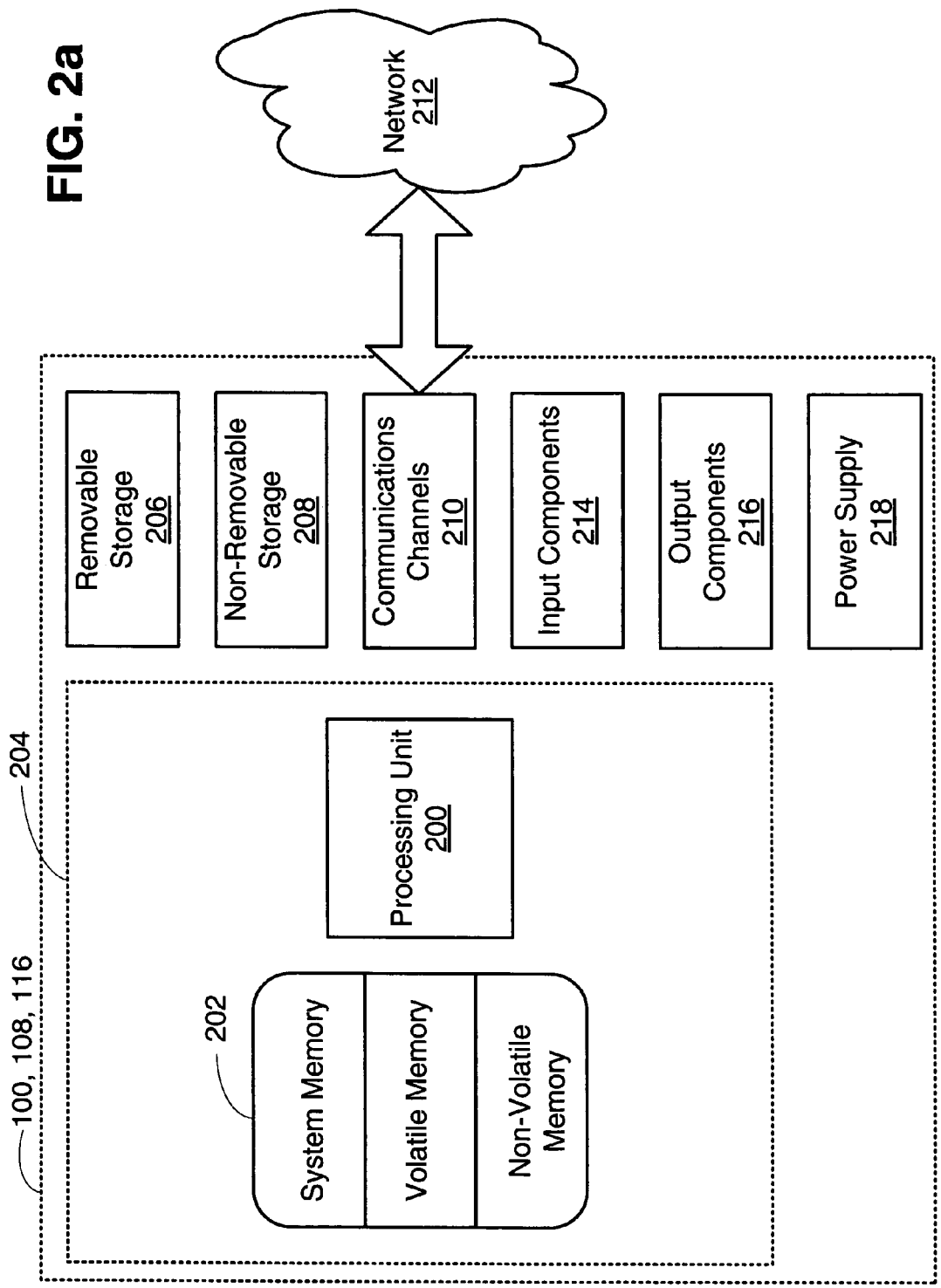
FIG. 2*a* is a schematic diagram generally illustrating an exemplary computing system that supports the present invention.

The host computing device 100 and the providers 108 and 116 of FIG. 1 may be of any architecture. FIG. 2*a* is a block diagram generally illustrating an exemplary computer system that supports the present invention. The computer system of FIG. 2*a* is only one example of a suitable environment and is not intended to suggest any limitation as to the scope of use or functionality of the invention. Neither should the host 100 or the providers 108 and 116 be interpreted as having any dependency or requirement relating to any one or combination of components illustrated in FIG. 2*a*. The invention is operational with numerous other general-purpose or special-purpose computing environments or configurations. Examples of well known computing systems, environments, and configurations suitable for use with the invention include, but are not limited to, personal computers, servers, hand-held or laptop devices, multiprocessor systems, microprocessor-based systems, set-top boxes, programmable consumer electronics, network PCs, minicomputers, mainframe computers, and distributed computing environments that include any of the above systems or devices. In their most basic configurations, the host 100 and the providers 108 and 116 typically include at least one processing unit 200 and memory 202. The memory 202 may be volatile (such as RAM), non-volatile (such as ROM or flash memory), or some combination of the two. This most basic configuration is illustrated in FIG. 2*a* by the dashed line 204. The host 100 and the providers 108 and 116 may have additional features and functionality. For example, they may include additional storage (removable and non-removable) including, but not limited to, magnetic and optical disks and tape. Such additional storage is illustrated in FIG. 2*a* by removable storage 206 and by non-removable storage 208. Computer-storage media include volatile and non-volatile, removable and non-removable, media implemented in any method or technology for storage of information such as computer-readable instructions, data structures, program modules, or other data. Memory 202, removable storage 206, and non-removable storage 208 are all examples of computer-storage media. Computer-storage media include, but are not limited to, RAM, ROM, EEPROM, flash memory, other memory technology, CD-ROM, digital versatile disks, other optical storage, magnetic cassettes, magnetic tape, magnetic disk storage, other magnetic storage devices, and any other media that can be used to store the desired information and that can be accessed by the host 100 or by the providers 108 and 116. Any such computer-storage media may be part of the host 100 or of the providers 108 and 116. The host 100 and the providers 108 and 116 may also contain communications channels 210 that allow them to communicate with other devices, including devices on a network 212. Communications channels 210 are examples of communications media. Communications media typically embody computer-readable instructions, data structures, program modules, or other data in a modulated data signal such as a carrier wave or other transport mechanism and include any information delivery media. The term "modulated data signal" means a signal that has one or more of its characteristics set or changed in such a manner as to encode information in the signal. By way of example, and not limitation, communications media include optical media, wired media, such as wired networks and direct-wired connections, and wireless media such as acoustic, RF, infrared, and other wireless media. The term "computer-readable media" as used herein includes both storage media and communications media. The host 100 and the providers 108 and 116 may also have input devices 214 such as a touch-sensitive display screen, a stylus, a keyboard 102, a mouse 104, a voice-input device, a camera 118, etc. Output devices 216 include the devices themselves, such as the touch-sensitive display screen, speakers, and a printer, and rendering modules (often called "adapters") for driving these devices. All these devices are well known in the art and need not be discussed at length here. The host 100 and the providers 108 and 116 each has a power supply 218. On the PDA provider 116, the power supply 218 includes a battery and may include circuitry for recharging the battery whenever the PDA provider 116 is in the cradle 114.

When operating in auxiliary mode, providers 108 and 116 use communications software to accept peripheral service requests from the host 100. As an example of this software, consider FIG. 2b's block diagram of Microsoft's "WINDOWS TERMINAL SERVICES." This software is especially useful when the peripheral being provided is a display screen. An application program 220 running on the host 100 sends its output to the operating system 224 intending that the output be displayed in one or more windows managed by the Desktop 222. If the windows reside on the touch-sensitive display screen of the PDA provider 116, however, the Terminal Services software component 226 intercepts the display output, reformats it, and delivers it to the Networking software component 228 for transport to the PDA provider 116. The display information is transported to the PDA provider 116 by a standard protocol such as Microsoft's Remote Desktop Protocol 230 or by the Independent Computing Architecture protocol. These protocols allocate the limited bandwidth of the communications channel, an especially important consideration when another bandwidth-intensive peripheral service, such as a camera, is provided by the PDA 116. When the display information reaches the Networking component 228 on the PDA provider 116, it is passed to the Terminal Services component 226. That component interprets the information and displays it on the touch-sensitive display screen of the PDA provider 116. This procedure is reversed for input generated on the PDA provider 116, such as by use of a stylus. The user input is presented to the host's application program 220 as if it were generated locally on the host 100.

Note that FIG. 2b is for illustrative purposes only, and the invention is not limited to the specific software components and protocols shown. In particular, the PDA provider 116 may run an operating system entirely different from that of the host 100. In the anticipated process of standardizing protocols, different peripheral services may be supported by different software components. For example, protocols TCP/IP, SPX, IPX, and NetBEUI may each be appropriate in certain situations. Appropriate transport methods include infrared and short-range radio such as Bluetooth, IEEE's 802.11b, and IEEE's 1394 Firewire, as well as proprietary solutions set by a manufacturer. The issues to be resolved in the standardization process, and ranges of appropriate resolutions, are well known in the art.

Figure 3A:
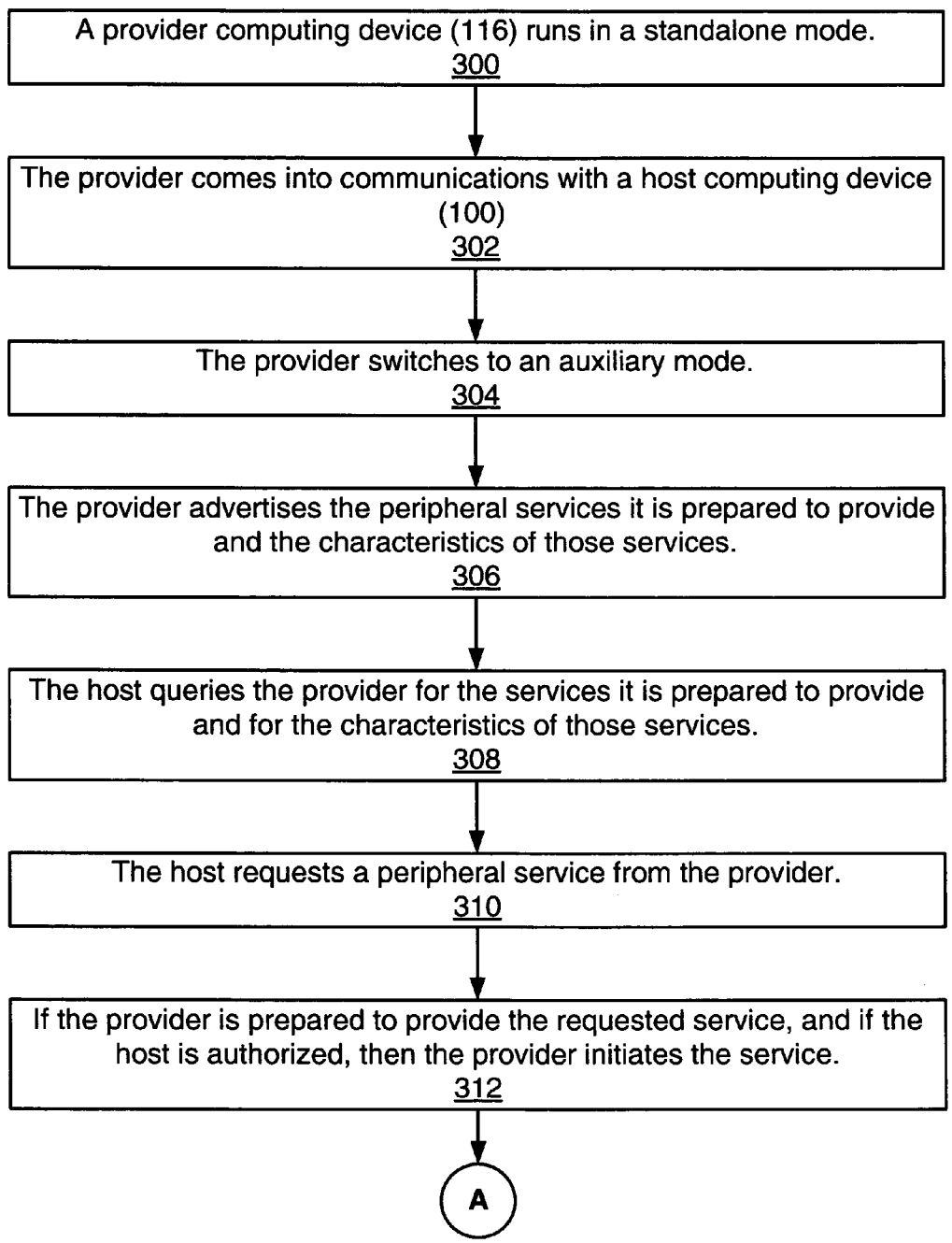
FIGS. 3*a* and 3*b* together form a flowchart showing an exemplary method according to the present invention for providing a peripheral service to a host.
Figure 3B:
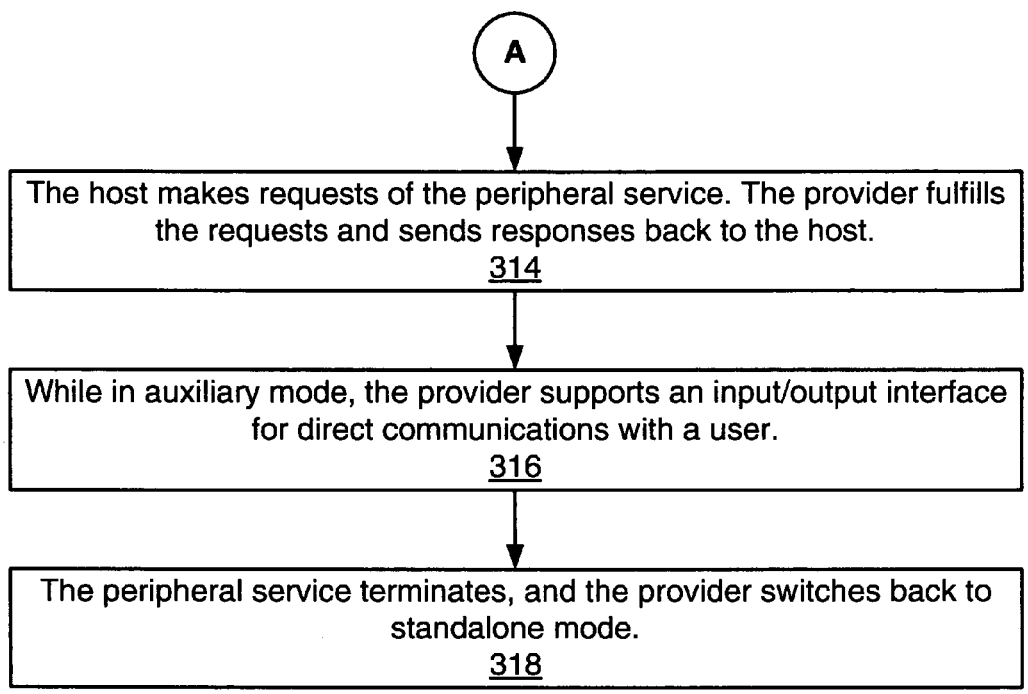

FIGS. 3a and 3b together present an exemplary method for providing a peripheral service to a host. Note that some of the steps of these Figures are performed on the host 100, some are performed on the PDA provider 116, and some are appropriate only for certain situations.

The example of FIGS. 3a and 3b begins in step 300 with the PDA provider 116 running in a standalone mode. In step 302, communications are established between the PDA provider 116 and the host 100. This can happen automatically when the PDA provider 116 is placed in the cradle 114 that is attached to the host 100. Step 302 can also involve a conscious choice on the part of the user of a provider. For example, the user of the laptop provider 108 sets up a wireless connection with the host 100.

Once the PDA provider 116 is in communications with the host 100, the PDA provider 116 switches to an auxiliary mode in step 304. This switching step 304 illustrates that the PDA provider 116 is becoming ready to provide a peripheral service to the host 100. If the PDA provider 116 has sufficient capacity in addition to that used to provide a peripheral service, it can still perform the functions of its standalone mode. This possibility is further discussed in reference to step 316.

In some embodiments, the PDA provider 116 in step 306 advertises the peripheral services that it is prepared to offer. The PDA provider 116 of the present example offers its touch-sensitive display screen. The characteristics of the offered peripheral services are also advertised. The set of these characteristics varies from one peripheral service to another. For the case of a display screen, characteristics may include the screen's pixel size and color depth. The PDA provider 116 can choose to advertise its screen as being smaller than it really is. In this case, the PDA provider 116 is offering as a peripheral service only a portion of its screen, presumably reserving the remainder of the screen for use in step 316.

In some embodiments, the PDA provider 116's advertising in step 306 is replaced or supplemented by the host 100's query in step 308. The host 100 asks either for a list of peripheral services available and for characteristics of those services or asks if a particular service with particular characteristics is available.

Many embodiments of the present invention choose to implement only one of steps 306 and 308. Both steps are included here for clarity and also to allow for an anticipated future in which devices are built according to the present invention by different manufacturers and using different, though compatible, embodiments of the methods described in this application. Yet another method exists: the host 100 is configured to assume that a peripheral service is available and acts accordingly. If the service is not available, then the host 100 acts just as if one of its directly connected peripherals were malfunctioning. This last method is often useful for working with legacy equipment because the host 100 need not be aware of the methods of the present invention in order to take advantage of them.

In any case, in step 310 the host 100 requests a particular peripheral service, with particular characteristics, from the PDA provider 116. This request can be, especially for the legacy equipment described immediately above, implicitly made when the host 100 assumes that the peripheral is attached and tries to access it.

If the PDA provider 116 is prepared to provide the requested peripheral service, then it can check the host 100's authorization in step 312. Well known techniques exist today for authorizing a client's access to a host-provided service, and those techniques are usable in the context of the present invention.

Step 314 of FIG. 3b encompasses the actual use of the peripheral service by the host 100. The host 100 uses the peripheral service in the same way that it would use a directly connected peripheral device. As one example, the host 100 uses its own display screen 106 to portray a live-action computer game. This game frequently allows a player to select options directing the course of the game. Rather than cluttering up the live-action display 106 with a menu of the user's options, this option menu is displayed on the PDA provider 116's display screen. The player uses a stylus on the touch-sensitive screen to select the options, and that selection is passed on to the game running on the host 100. In another example, the host 100 accepts video input produced by the camera 118 on the laptop provider 108.

As discussed above in reference to FIG. 2b, the particulars of the interactions between the host 100 and a provider, the commands and their responses, the status, and the system components that support these interactions are particular, at least in part, to a particular peripheral service. For the wide range of existing peripheral devices, techniques well known in the art are usable as is or can be modified in a straightforward manner to suit the methods of the present invention. As an example of these techniques when the peripheral service involves a display screen, consider U.S. patent application Ser. No. 09/556,982, "Auxiliary Display Unit for a Computer System," filed Apr. 24, 2000, which is incorporated herein by reference in its entirety.

Step 316 illustrates that although the PDA provider 116 switches to auxiliary mode in step 304, the PDA provider 116 does not lose the capabilities it possesses when running in standalone mode. Providing a peripheral service to the host 100 consumes some resources, but the remaining resources are enough to allow a user to access the PDA provider 116 independently of the host 100. For example, and as mentioned above, the PDA provider 116 need not advertise its entire display screen as available to the host 100. The remainder of the screen can be used to present an input/output interface to a user in step 316. Also, the PDA provider 116 may run "background" tasks for the user and display status messages over the display information sent by the host 100. In some embodiments, the demands of providing a peripheral service are so great that the provider can do little else. In other embodiments, such as when the laptop provider 108 provides its camera 118 to the host 100, a user of the laptop provider 108 hardly notices that he commands anything less than the full power of the provider.

Step 318 merely illustrates the fact that a provider can return to standalone mode. A provider can become a host, using a peripheral service provided by another provider. All sorts of combinations are possible, limited mostly by the processing power of the providers and by the capacity of the communications channels linking the providers to the hosts. Indeed, some combinations blur the distinction between host and provider. For example, consider again the scenario of FIG. 1 with the desktop PC 100 and the PDA 116 in its docking station 114. Assume that the PC's display screen 106 is not touch-sensitive and that the user therefore wishes to use the touch-sensitive screen of the PDA 116. Unlike in the scenarios described above, here it is the PDA 116 that requests a connection to the PC 100. This setup allow the user to interact with the touch-sensitive screen and keys of the PDA 116 to control processing on the desktop PC 100. In this scenario, which device, the PDA 116 or the PC 100, is the peripheral provider and which is the host? Of course, the answer is that it does not matter. What matters is that the methods of the present invention allow two (or more) computing devices to work together to provide capabilities beyond the individual level of either device.

Figure 4B:
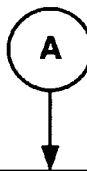

The flowchart of FIGS. 4a and 4b illustrates, from the point of view of the host 100, a specific embodiment of the method of FIGS. 3a and 3b, applicable when the provided device is a display screen. Comments made above about the previous method apply, mutatis mutandis, to the method of FIGS. 4a and 4b. The beginning of the present method parallels the method of FIGS. 3a and 3b, with steps 400, 402, and 404 analogous to the previous method's steps 302, 306, and 308, respectively.

In step 406, a special case of the previous method's step 308, the host 100 requests at least a portion of the provider 116's display screen. The host 100 can specify the amount of screen area requested in terms, for example, of the pixel dimensions of a rectangular area. In step 408, the provider 116 allows the request and begins to provide screen services to the host 100.

Figure 5:
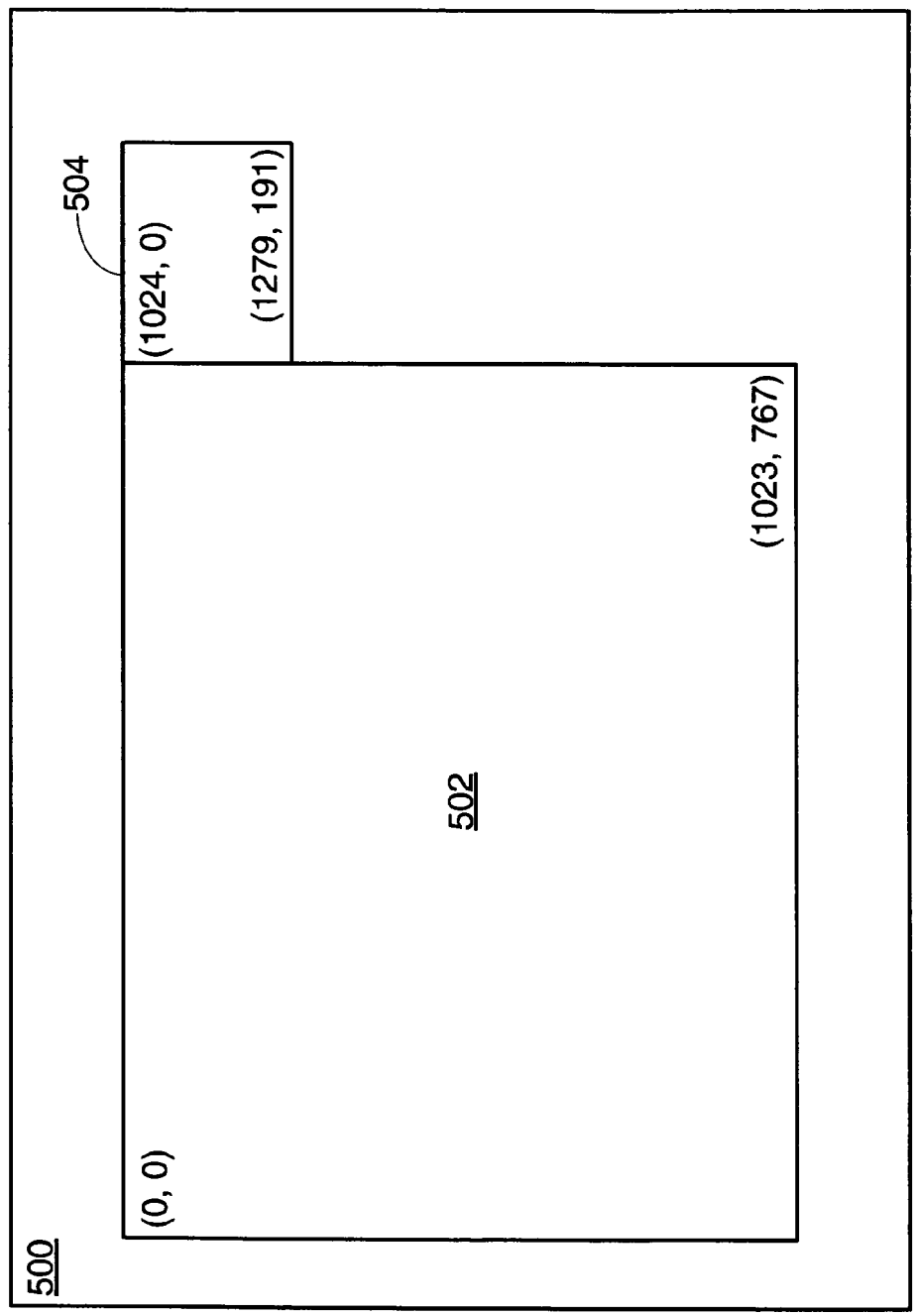
FIG. 5 is a schematic diagram illustrating the host's video memory when using the method of FIGS. 4*a* and 4*b*.

In order to control the provided screen, the host 100 allocates to it an area of the host 100's own video memory in step 410. FIG. 5 gives an example of the host 100's video memory 500. Box 502 represents the video memory area associated with the host 100's local screen 106. The numbers in the top left and bottom right of video memory area 502 represent the pixel coordinates of these corners of the display screen 106: That screen is 1024 pixels wide by 768 pixels high. In step 410, the host 100 allocates a new video memory area 504 to represent the portion of the display screen provided by provider 116. From the coordinates, it can be seen that the provided screen portion measures 256 pixels by 192 pixels. The host 100 treats the two video memory areas 502 and 504 as one continuous area. The relative, virtual locations of memory areas 502 and 504 can be adjusted to suit the host 100.

In step 412 of FIG. 4b, the host 100 uses the combined video memory areas 502 and 504 to control the provided screen. For example, when a mouse cursor moves rightward from the top, right portion of area 502, it enters the top left portion of area 504. That movement can be represented on the display screens associated with these two memory areas. With this technique, the host 100 uses its video memory 500 to access both its local screen 106 and the provider 116's screen, thus hiding implementation details from applications that use the screens.

Finally, the host 100 releases the provided screen in step 414 and also releases the video memory 504 allocated to its control.

In view of the many possible embodiments to which the principles of the present invention may be applied, it should be recognized that the embodiments described herein with respect to the drawing figures are meant to be illustrative only and should not be taken as limiting the scope of the invention. Those of skill in the art will recognize that some implementation details, such as details surrounding peripheral service discovery and communications between host and provider, are determined by the protocols chosen for specific situations. Although the invention is described in terms of software modules or components, some processes may be equivalently performed by hardware components. Therefore, the invention as described herein contemplates all such embodiments as may come within the scope of the following claims and equivalents thereof.

We claim:

1. A system for a peripheral device having at least one service to provide the at least one service to a host computing device, at least one characteristic corresponding to the at least one service and the host computing device being distinct from the provider computing device, the system comprising:
means for running the peripheral device in a standalone mode, wherein the peripheral device sends information regarding the at least one characteristic of the at least one service to the host computing device;
means for receiving a request from the host computing device at the peripheral device responsive to sending the information regarding the at least one characteristic, the request being to provide the at least one service and to provide the peripheral device as an auxiliary peripheral device to the host computing device;
means for switching to an auxiliary mode; and
while running in the auxiliary mode, means for receiving commands from the host computing device at the peripheral device and operating the peripheral device in accordance with the received commands to provide the at least one service.

2. The system of claim 1 wherein a service comprises an input function and wherein operating the peripheral device comprises receiving input information, the system further comprising:
means for sending received input information to the host computing device.

3. The system of claim 1 wherein running in the peripheral device in a standalone mode comprises providing a command interface to a user of the peripheral device.

4. The system of claim 3 wherein running in the auxiliary mode comprises providing a command interface to a user.

5. The system of claim 1 wherein receiving commands from the host computing device comprises running a Windows Terminal Services session with the host computing device.

6. The system of claim 1 wherein operating the peripheral device comprises translating commands received from the host computing device into a format acceptable to the peripheral device.

7. The system of claim 1 further comprising:
means for indicating a readiness to provide the peripheral device in response to the request.

8. The system of claim 1 further comprising:
means for checking an authorization of the host computing device before providing the peripheral device upon receiving a request.

9. The system of claim 1 further comprising:
means for providing status information to the host computing device.

10. The system of claim 1 wherein the at least one characteristic of the at least one service includes information about the capability of the peripheral device.

11. The system of claim 1 further comprising:
means for receiving a request to stop providing the peripheral device as an auxiliary peripheral device to the host computing device; and
means for switching to the standalone mode.

12. The system of claim 1 wherein the host computing device comprises a host peripheral device, the system further comprising:
means for requesting that the host computing device provide its host peripheral device as an auxiliary peripheral device to the peripheral device; and
means for sending commands to the host computing device intended for the host's peripheral device.

13. A system for a host computing device to use, as an auxiliary peripheral device to the host computing device, at least a portion of a display screen of a peripheral device, the host computing device distinct from the peripheral device, the system comprising:
means for receiving from the peripheral device information regarding a characteristic of the display screen;
means for requesting that the peripheral device provide at least a portion of the display screen as an auxiliary peripheral device to the host computing device in response to receiving the information regarding the characteristic;
means for allocating video memory on the host computing device to accommodate at least a portion of the display screen based on the characteristic;
means for accessing the allocated video memory to control, at least in part, the display screen; and
means for sending commands intended to operate at least a portion of the display screen responsive to the characteristic.

14. The system of claim 13 wherein the display screen is a touch-sensitive display screen, the system further comprising:
means for receiving touch input information from the display screen.

15. The system of claim 13 wherein the host computing device comprises a receiver, the system further comprising:
means for establishing communications with the peripheral device upon detecting that the peripheral device is in contact with the receiver.

16. The system of claim 13 further comprising:
means for receiving from the peripheral device an indication of readiness to provide the display screen.

17. The system of claim 13 further comprising:
means for providing authorization information to the peripheral device.

18. The system of claim 13 further comprising:
means for receiving status information from the peripheral device.

19. The system of claim 13 wherein the characteristic includes capability information about the display screen, the capability information selected from the group consisting of pixel size and color depth.

20. The system of claim 15 wherein the host computing device comprises a host peripheral device, the system further comprising:
means for receiving a request that the host computing device provide the host peripheral device as an auxiliary peripheral device to the peripheral device; and
means for receiving commands from the peripheral device to operate the host peripheral device in accordance with the received commands.

* * * * *